United States Patent [19]

Wirtanen et al.

[11] 4,198,759
[45] Apr. 22, 1980

[54] OPTICAL PLUMMET AZIMUTH REFERENCE ASSEMBLY

[75] Inventors: Theodore E. Wirtanen, Nashua, N.H.; Ronald M. Hitchcock, Bedford, Mass.

[73] Assignee: The United States of America as represented by the Secretary of the Air Force, Washington, D.C.

[21] Appl. No.: 936,980

[22] Filed: Aug. 25, 1978

[51] Int. Cl.² .................. G01C 1/00; G01C 15/00
[52] U.S. Cl. ........................................ 33/281; 33/290
[58] Field of Search .............. 33/290, 291, 276, 281, 33/282, 285, 297, 298, 299, 227; 356/139, 142, 147

[56] References Cited

U.S. PATENT DOCUMENTS

| | | | |
|---|---|---|---|
| 494,876 | 4/1893 | Merrill | 33/290 |
| 761,219 | 5/1904 | Goodwin | 33/290 |
| 2,235,898 | 3/1941 | Niemeyer | 33/281 |
| 3,783,524 | 1/1974 | Ciani, et al. | 33/285 |

OTHER PUBLICATIONS

"Applied Optics" vol. 11, No. 2, Feb. 1972, pp. 323-325.

Primary Examiner—Willis Little
Attorney, Agent, or Firm—Joseph E. Rusz; Jacob N. Erlich

[57] ABSTRACT

An optical plummet azimuth reference assembly having a rigid, horizontal support containing a centerline inscribed therein and a pair of upstanding elements mounted on the support located at each end of the centerline. Each upstanding element has a vertical reticle co-planar with the centerline and a horizontal reticle, the vertical and horizontal reticles forming a cross therebetween. By mounting the azimuth reference assembly directly on an optical plummet with the centerline of the azimuth reference assembly co-planar with the centerline reticle of the optical plummet, the azimuth reference line of an object aligned with the centerline reticle of the optical plummet can be accurately and quickly ascertained.

5 Claims, 3 Drawing Figures

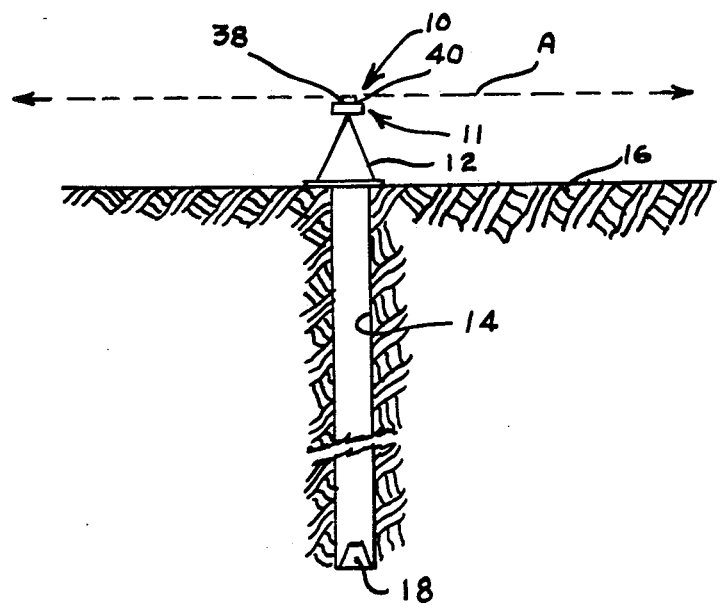
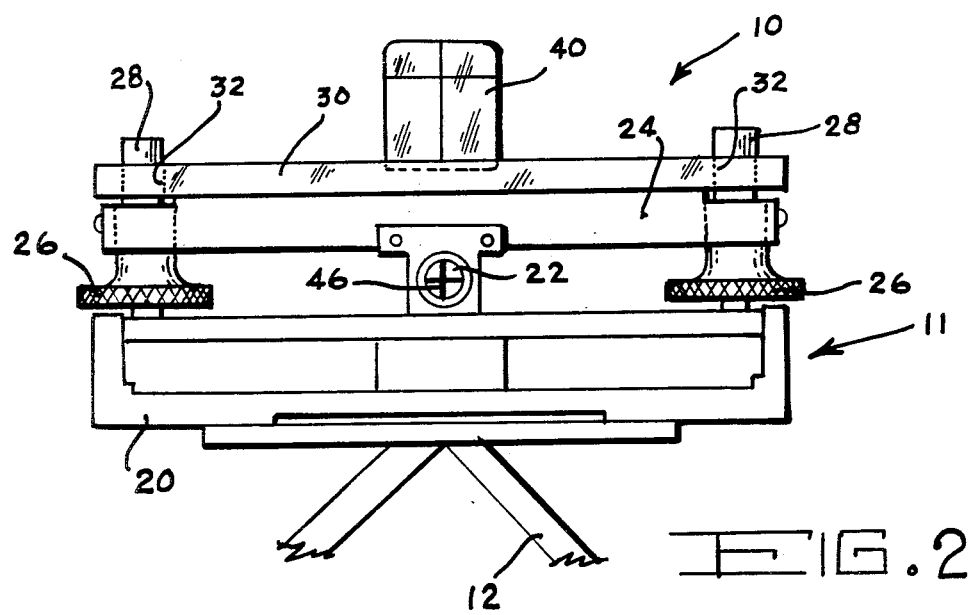

OPTICAL PLUMMET AZIMUTH REFERENCE ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical plummets, and, more particularly, to an azimuth reference assembly for use with an optical plummet to permit development of a reference azimuth as the observing station with respect to an underground or elevated object which is being referenced by the optical plummet.

In any area in which an optical plummet is utilized for precise vertical alignment of either an elevated or underground target or object it may also become necessary to increase the use of the optical plummet by making it available to align a reference mark on the target or object to both the local vertical and to the azimuth plane passing through the target being aligned. For example, this problem arises quite frequently in the construction of mining shafts, in the laying of underground pipes, in the axial orientation of bore hole tiltmeters and in the referencing of targets located in space.

Heretofore, such alignment problems relied heavily on inaccurate trial and error procedures. For example, one way of establishing azimuth down a shaft was to use two plumbed lines along the azimuth line. These were observed at the surface and with the use of a theodilite an azimuth value was "backed in" at the surface from visible references. Not only did these alignment measurements prove to be extremely inaccurate and therefore create many of the construction problems encountered today, but also such methods of the past proved to be a costly procedure for yielding results which, in many instances, were virtually useless.

SUMMARY OF THE INVENTION

The instant invention overcomes the problems encountered in the past by providing an optical plummet azimuth reference assembly which capitalizes on the design symmetry of the optical plummet. Consequently this invention increases the use of the optical plummet by making it available to align a reference mark on a target or the target itself both as to the local vertical and the azimuth plane passing through the target being aligned.

The azimuth reference assembly of this invention is made up of a sturdy, horizontal, preferably transparent support, having a centerline scribed therein. At the ends of this centerline, a pair of opposed vertical elements made of a transparent material extend from the horizontal support. A vertical reticle is inscribed in each vertical element, the vertical reticles being co-planar with the centerline of the support. In addition a horizontal reticle is scribed on each vertical element crossing the vertical reticle to describe a cross.

The azimuth reference assembly of this invention is fastened to a conventional optical plummet in such a way that its reference centerline is co-planar with the centerline reticle of the optical plummet. When the plummet's centerline is oriented with respect to the reference marks on a target or the target itself which is either located underground or in space, the azimuth reference line will be identically oriented and can be immediately used to establish a line or azimuth reference mark at the observing surface with respect to the subterranean or elevated target.

In use an observer sights through and aligns the crosses formed by the vertical and horizontal reticles on the vertical elements of the azimuth reference assembly of this invention. Because of the relationship of the assembly to the optical plummet to which it is attached, the observer is therefore also looking in the direction of the vertical reticle of the optical plummet. Not only can an observer visually sight the horizontal azimuth of the target being aligned, but with the use of already existing sighting instruments such as a laser this horizontal azimuth alignment can be performed by programmed instrumentation. In addition, by varying the attachment of the azimuth reference assembly of this invention, the instant invention can also be used on any zenith/nadir optical plummet or detachable theodolite tribrach which has an optical plummet associated therewith.

It is therefore an object of this invention to provide an azimuth reference assembly which is capable of being coupled to an optical plummet, whereby the azimuth reference assembly can be easily centered over-/under the target with the azimuthal orientation instantly available.

It is another object of this invention to provide an optical plummet azimuth reference assembly which is therefore extremely useful in establishing the azimuthal orientation of instruments placed in shafts or wells or targets in space.

It is still another object of this invention to provide an optical plummet azimuth reference assembly which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWINGS

FIG. 1 is a schematic illustration of the optical plummet azimuth reference assembly of this invention utilized in the alignment of a subterranean target and providing a horizontal azimuth thereof;

FIG. 2 is a side elevational view of the optical plummet azimuth reference assembly of this invention shown in its operative position on a typical optical plummet.

DETAILED DESCRIPTION OF THE PREFERRED EMBODIMENT

Figure 3:
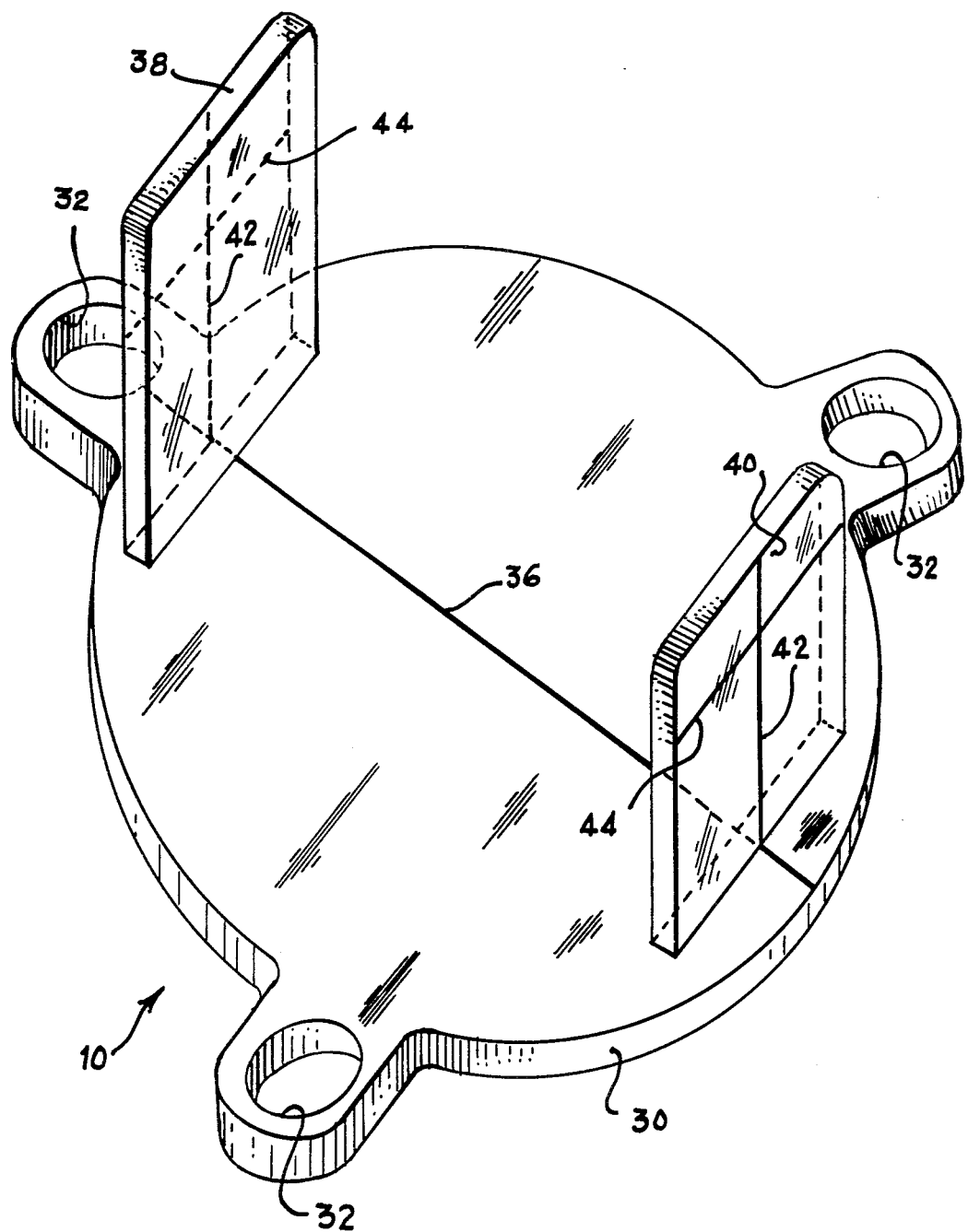
FIG. 3 is a pictorial representation of the azimuth reference assembly of this invention showing in detail the centerline and pair of vertical elements situated thereon.

Reference is now made to FIG. 1 of the drawing which shows in schematic fashion the optical plummet azimuth reference assembly 10 of this invention mounted upon a typical optical plummet 11. Optical plummet 11 is in turn fixedly secured upon the conventional tripod 12 mounted, for example, above a shaft 14 buried deep within the earth surface 16. Located at the bottom of shaft 14 is an object 18 such as a tiltmeter or pipe whose orientation must be determined. In addition to the determination of the vertical orientation of object 18 which can be readily obtained by a typical optical plummet 11, it is also necessary in some instances to determine the objects orientation with respect to the azimuth plane passing therethrough. This determination, as represented by dotted lines A, is performed by the use of the azimuth reference assembly 10 of this invention utilized in conjunction with a typical optical plummet 11.

Reference is now made to FIG. 2 of the drawing which shows in detail the optical plummet azimuth reference assembly 10 in its operative postion. Optical plummet azimuth reference assembly 10 is utilized in conjunction with a typical optical plummet 11 such as a Kern optical plummet. Optical plummet 11 is generally made of a rigid base structure 20 made of any suitable material such as steel. Optical plummet 11 is affixed in any conventional manner such as by clamping (not shown) to a tripod 12 as shown in FIG. 1 of the drawing. The determination of the vertical alignment of object 18 viewed by optical plummet 11 is made by viewing object 18 through the eyepiece 22 located on an adjustably mounted frame 24. Frame 24 can be leveled by any conventional leveling arrangement such as three alignment nuts 26 (only two of which are shown in the drawing) so that frame 24 remains in the completely level horizontal position. Situated above each adjusting nut 26 is an upstanding element 28 or the like (generally 3 in number for a typical optical plummet 11).

The azimuth reference assembly 10, best shown in FIG. 3 of the drawing, is removably secured to the optical plummet 11 by means of these three upstanding elements 28 in a manner to be described in detail hereinbelow. It should be noted that although the manner of securing azimuth reference assembly 10 to optical plummet 11 by way of upstanding elements 28 as depicted in the drawing of the instant application is acceptable with those optical plummets containing upstanding elements 28, other fastening means or devices can be utilized with azimuth reference assembly 10 and optical plummet 11 and still have the azimuth reference assembly 10 function properly.

Azimuth reference assembly 10 is formed of a rigid, preferably transparent, horizontal support 30 generally made in the configuration of the optical plummet 11. Consequently, the configuration shown in the drawing is circular. This limitation however is not critical and any other configuration in which azimuth reference assembly 10 can be readily adapted for use with optical plummet 11 is acceptable. In addition, support 30 has as a part thereof and as shown in FIG. 3 of the drawing three mounting apertures 32 located equidistant about the periphery of support 30. With the instant invention, it is critical that support 30 be made of a sturdy material such as plexiglass and be capable of complete horizontal alignment.

As shown in FIG. 3 of the drawing a centerline 36 is scribed within the horizontal support 30. Located at each end of centerline 36 are a pair of upstanding viewing elements 38 and 40 which may be embedded in or mounted upon support 30. It is essential that the material from which these upstanding viewing elements 38 and 40 be made be transparent and that each of these upstanding elements 38 and 40 have etched therein a vertical reticle 42 and a horizontal reticle 44 forming therebetween a cross. The verticle reticle 42 must be constructed co-planar with the centerline 36 of the base support 30 of the azimuth reference assembly 10 of this invention.

In mounting azimuth assembly 10 upon optical plummet 11 it is critical that centerline 36 of the azimuth reference assembly 10 be co-planar with the centerline reticle 46 (shown in FIG. 2) of optical plummet 11. After such alignment, azimuth reference assembly 10 is secured to optical plummet 11 by in its proper orientation by situating apertures 32 over the upstanding elements 28 of optical plummet 11. For convenience, such a mounting arrangement is depicted with the instant invention, however, any other conventional fastening means may be utilized with the instant invention.

During operation, vertical alignment of the target or object 18 is accomplished by conventional utilization of optical plummet 11 with the horizontal azimuth of the target being determined by the utilization of the azimuth reference assembly 10 of this invention. The horizontal azimuth can be easily determined by having an observer sight through and align the crosses formed on upstanding elements 38 and 40, respectively, until they overlap. In this condition the observer is looking down the centerline of the azimuth reference assembly 10 of this invention and because of its relationship to the centerline of the attached optical plummet 11, the observer is now looking along the horizontal azimuth of the target or object sighted either below or above the optical plummet. Consequently, an extremely accurate and rapid horizontal azimuth reference can be obtained.

Although this invention has been described with reference to a particular embodiment, it will be understood that this invention is also capable of further and other embodiments within the spirit and scope of the appended claims.

I claim:

1. In an optical plummet having a base structure, an adjustable frame, a sighting means secured to said frame and a centerline reticle which can be viewed through said sighting means, the improvement therein being in the form of an azimuth reference assembly operably attached to said frame, said azimuth reference assembly comprising a rigid support, a centerline located on said support, said centerline being co-planar with said centerline reticle of said optical plummet, a pair of upstanding transparent elements mounted on said support, said elements being situated at opposite ends of said centerline, each of said upstanding elements having a vertical reticle and a horizontal reticle thereon forming a cross therebetween, said vertical reticle on each of said upstanding elements being co-planar with said centerline of said azimuth reference assembly and means operably associated with said support structure for removably securing said azimuth reference assembly to said frame whereby upon alignment of said centerline of said optical plummet with respect to an object to be aligned, the azimuth reference line of said object can also be concurrently ascertained.

2. In an optical plummet as defined in claim 1 wherein said rigid support of said azimuth reference assembly is made of a transparent material.

3. In an optical plummet as defined in claim 2 wherein said means for removably securing said azimuth reference assembly t ) said frame is in the form of a plurality of apertures spaced equidistant around the periphery of said support.

4. In an optical plummet as defined in claim 3 wherein both of said upstanding elements of said azimuth reference assembly are removably mounted on said support.

5. In an optical plummet as defined in claim 4 wherein said support and said upstanding elements of said azimuth reference assembly are made of plexiglass.

* * * * *